United States Patent
Schlipf et al.

(10) Patent No.: US 9,923,349 B2
(45) Date of Patent: Mar. 20, 2018

(54) ARRANGEMENT FOR GUIDING A CABLE BETWEEN A WING AND AN AERODYNAMIC BODY MOVABLY SUPPORTED RELATIVE THERETO; WING OF AN AIRCRAFT HAVING SUCH AN ARRANGEMENT AND AIRCRAFT HAVING SUCH A WING

(71) Applicant: Airbus Operations GmbH, Hamburg (DE)

(72) Inventors: Bernhard Schlipf, Hamburg (DE); Johanna Pyrczek, Bremen (DE); Michael Roters, Nordwalde (DE)

(73) Assignee: Airbus Operations GmbH (DE)

( * ) Notice: Subject to any disclaimer, the term of this patent is extended or adjusted under 35 U.S.C. 154(b) by 26 days.

(21) Appl. No.: 14/475,650

(22) Filed: Sep. 3, 2014

(65) Prior Publication Data
US 2015/0069183 A1 Mar. 12, 2015

(30) Foreign Application Priority Data
Sep. 10, 2013 (EP) .................................... 13183777

(51) Int. Cl.
*B64C 1/00* (2006.01)
*H02G 3/04* (2006.01)
(Continued)

(52) U.S. Cl.
CPC ............. *H02G 3/0437* (2013.01); *B64C 9/22* (2013.01); *B64D 15/12* (2013.01); *H02G 11/006* (2013.01)

(58) Field of Classification Search
CPC .... B64C 9/00; B64C 9/02; B64C 9/16; B64C 9/18; B64C 9/04; B64C 9/06; B64C 9/30;
(Continued)

(56) References Cited

U.S. PATENT DOCUMENTS 4,470,569 A * 9/1984 Shaffer ..................... B64C 9/22
 244/213
4,545,555 A * 10/1985 Koch ..................... F16M 11/10
 248/280.11
(Continued)

FOREIGN PATENT DOCUMENTS

CN 101017968 A 8/2007
CN 102044857 A 5/2011
(Continued)

OTHER PUBLICATIONS

European Search Report (EP 13183777.5)(dated Jun. 5, 2014).

*Primary Examiner* — Medhat Badawi
*Assistant Examiner* — Vicente Rodriguez
(74) *Attorney, Agent, or Firm* — Lerner, David, Littenberg, Krumholz & Mentlik, LLP

(57) ABSTRACT

An assembly for guiding a cable between a structural part of an aircraft and a movable aerodynamic body includes a chain of pivotally connected links, a first coil device arranged between each pair of the links for guiding the cable between two angular positions, and a second coil device arranged at the first end of the chain for passing the cable from the chain to the aerodynamic body. The support of the assembly is statically determinate through the use of a bracket pivotally connected to one of the links at the structural part, which bracket does not permit a translative motion relative to the structural part. This is further supported by a bearing located at one of the links which is connected to the second coil device, which bearing permits angular rotation at least in two orthogonal directions, but no translative motion relative to the aerodynamic body.

14 Claims, 5 Drawing Sheets

(51) Int. Cl.
*B64D 15/12* (2006.01)
*B64C 9/22* (2006.01)
*H02G 11/00* (2006.01)

(58) Field of Classification Search
CPC .......... H02G 3/04; H02G 11/00; B64D 15/12; F16C 2326/43
USPC ..................................................... 244/129.1
See application file for complete search history.

(56) References Cited

U.S. PATENT DOCUMENTS

| | | | | |
|---|---|---|---|---|
| 5,141,446 | A * | 8/1992 | Ozouf | H04M 1/0216 16/223 |
| 7,249,735 | B2 * | 7/2007 | Amorosi | B64C 13/24 244/214 |
| 7,530,825 | B2 | 5/2009 | Sato et al. | |
| 2006/0038088 | A1 * | 2/2006 | Dodson | B64C 13/24 244/214 |
| 2007/0034747 | A1 | 2/2007 | Amorosi et al. | |
| 2011/0100679 | A1 * | 5/2011 | Biggadike | H02G 11/00 174/135 |
| 2011/0253832 | A1 * | 10/2011 | Wildman | B64C 9/02 244/99.13 |

FOREIGN PATENT DOCUMENTS

| | | |
|---|---|---|
| DE | 10 2005 039 649 A1 | 3/2006 |
| EP | 2 397 404 A2 | 12/2011 |

* cited by examiner

ARRANGEMENT FOR GUIDING A CABLE BETWEEN A WING AND AN AERODYNAMIC BODY MOVABLY SUPPORTED RELATIVE THERETO; WING OF AN AIRCRAFT HAVING SUCH AN ARRANGEMENT AND AIRCRAFT HAVING SUCH A WING

The invention relates to an assembly for guiding a cable between a structural part of an aircraft and an aerodynamic body movably supported relative thereto. The invention further relates to a wing of an aircraft having such an assembly and, furthermore, to an aircraft having such a wing.

BACKGROUND OF THE INVENTION

In aircraft, often electrical connections, i.e. one or more cables, between an aircraft wing structure and an aerodynamic body movably supported relative thereto are present, e.g. for connecting electrical de- or anti-icing devices to a central power source. Due to the relative motion it is mandatory to route or guide the necessary cables such that they are protected from mechanical damage and provide a reliable function for a desired lifetime period.

US 2011/0100679 A1 describes a pair of mechanical links pivotally connected to pivot relative to one another about a lateral pivot axis and extending between a wing structure and a slat supported movable relative thereto. A cable extends along both links and a wound section with a winding axis coincident with the pivot axis is provided, wherein a cable protecting housing is arranged at each end of the wound section.

BRIEF SUMMARY OF THE INVENTION

In case additional deflecting motions between an extended aerodynamic body, such as a slat, and the aircraft structure, such as a wing structure, due to air loads during flight occur, constraining forces are induced into the links of such an assembly for guiding cables. The constraining forces may laterally to the existing pivoting axes and result in the requirement for a more conservative design with a much larger rigidity than necessary for the main purpose of guiding a cable An aspect of the invention may provide an improved assembly for guiding a cable between an aircraft structure and an aerodynamic body movably supported thereto, that is less subjected to these constraining forces.

An assembly for guiding a cable between a structural part of an aircraft in an aerodynamic body movably supported relative to the structural part is proposed. The assembly comprises a chain of at least two pivotally connected links, the chain having a first end and a second end for receiving the cable from the structural part and introducing it into the chain of links, a first coil device arranged between each pair of the at least two pivotally connected links for guiding the cable between two variable angular positions of the associated links, a second coil device arranged at the first end of the chain for passing the cable from the chain of links to the aerodynamic body and a bracket pivotally connected to one of the links situated at the second end for mounting the chain at the structural part, which bracket permits an angular rotation around one axis, but no translative motion relative to the structural part. The assembly is characterized by a bearing located at one of the links which is connected to the second coil device at the first end of the chain, which bearing permits an angular rotation at least in two orthogonal directions, but no translative motion relative to the aerodynamic body.

In general, this assembly for guiding a cable according to an embodiment of the invention is an extendable and collapsible/foldable device, which is designed so as to extend between the respective structural part of the aircraft and the respective aerodynamic body movably supported relative thereto. The cable that needs to be guided from a power source inside the structural part to the movable aerodynamic body is thereby held by the assembly and safely and without damages follows the relative motion between these two parts.

Core components of the assembly according to an embodiment of the invention are the links, which provide a protected running surface for the cable. For this purpose, the links comprise a receiving space for receiving and holding the cable, which receiving space may be provided through the appropriate design of the cross-sectional profile surface of the links having a cut-out for introducing the cable into the interior of the links, such that a rim- or channel-like structure or a hollow space results, in which the cable is held. Preferably, the cable inserted into the links is held in place by fasteners or holders, such as clips or brackets arranged in the links by the use of positive connecting means, such as snap-in fasteners, adhesives or non-positive connecting means. When the relative motion of the structural part and the aerodynamic body is conducted, the assembly follows this motion and permanently holds the cable protected inside the links between the first end and the second end.

The first coil devices are to be understood as arrangements that allow the pivoting of the links connected to the first coil devices repeatedly, while the cable is permanently inserted in the respective first coil device and follows the pivoting motion of the associated links. By using these first coil devices, the cable is protected in the pivoting region between two adjacent links such that it is not necessary to let a part of the cable extend outwardly in a joint region between two links for being able to easily follow the motion of the links. The first coil devices therefore act as cable protectors.

The second coil device may be similar to the first coil device. According to an embodiment of the invention, the second coil device may include the bearing that permits an angular rotation in the at least two orthogonal directions or it may be connected thereto. By using such a bearing, only translational forces can be transmitted through the chain of links, but a bending force or moment cannot be introduced into the link connected to this bearing. In case any air load induced additional motion in a direction orthogonal to the extension direction of the links occurs, the bearing simply eliminates the urge to bend the extended link chain between the aerodynamic body and the structural part.

In other words, a great advantage of this bearing is based on the fact that a kinematic decoupling of the assembly according to an embodiment of the invention is achieved. The whole assembly, which extends from the aerodynamic body to the aircraft structure, is consequently supported in a statically determinate way through the bracket and the bearing. Hence, neither additional deflections due to air loads, nor thermal expansions lead to constraining forces that may result in additional structural loads. The assembly being statically determinate means that a static equilibrium can always be maintained. Hence, the static equations are sufficient for determining the internal forces and reactions on the assembly and the sums of the force components in every spatial direction equal zero; the same applies for the sum of moments of all forces.

Altogether, this allows for a more lightweight design of the assembly as well as a clearly increased reliability for operation. Consequently, the maintenance requirements are clearly reduced.

In a preferred embodiment, the bearing that permits an angular rotation in at least two orthogonal directions is a spherical bearing. Such a bearing may comprise an outer ring and an inner ring, between which rolling elements are placed that allow for a rotation about a central axis of each of the rings. For the purpose of additionally allowing an angular rotation of the inner ring and the outer ring of the spherical bearing such that their radial extension planes may intersect with each other, the outer surface of the inner ring and the inner surface of the outer ring are spherical or toroidal. These spherical bearings may be designed in a maintenance-free manner and consequently allow for a distinct reliability, which is particularly useful for installations in an aircraft.

In an advantageous embodiment, a first coil device comprises a joint having a joint axis, around which the cable is wound with at least one complete winding. The winding of the cable inside the first coil device is helical. The first coil device, which acts as a cable protector, may comprise a disk-like shape with a central opening to accommodate the joint axis and may preferably be produced by two main components that may engage each other, rotate around the joint axis independently and enclose the wound section of the cable. By winding the cable around the joint axis with at least one complete winding, a cable section that enters the first coil device and a cable section that exits the first coil device always enclose an angle relative to each other that is larger than 360°. The helical cable coil generated in the first coil device allows to alter the angle between the incoming cable section and the outgoing cable section simply, while not requiring a large installation space for the cable in this joint region and for gentle handling of the cable.

It is furthermore advantageous to accommodate further helical coils in a single first coil device, for example by providing two or more separate receiving spaced within the respective links that run into a certain section of the associated first coil device, which may either be separated or belong to the same cross section.

In a preferred embodiment, two subsequent first coil devices connected to the same link are covered by a single cover plate, which extends between the two first coil devices and covers a recess of the respective link as well as the central openings of both first coil devices. This simplifies the assembly, repair and maintenance of the assembly according to the invention significantly. A cable guided in the chain of links may easily be maintained by simply removing the cover plate and exemplarily removing or mounting it in the first coil devices.

In a further embodiment, the cover plate is removable from the respective link without the necessity for disassembling the chain. Consequently, all adjacent components do not cover or overlap the cover plate such that maintenance, assembly or disassembly of the cover plate or the cable behind the cover plate is hindered.

In a still further exemplary embodiment, the bracket comprises a joint which permits an angular position rotation exclusively in a first direction of rotation. By limiting the rotational axis at one end of the chain, a precise, reliable and repeatable unfolding and folding operation of the assembly according to the invention may be conducted due to the limited degree of freedom.

Still further, the pivotally connected links are adapted for conducting an angular rotation exclusively in a second direction of rotation. This limits the pivoting action between two connected joints, such that the degree of freedom of the chain of links itself is limited and the assembly may precisely and reliably follow the motion of the aerodynamic body. Also, this supports the compactness of the folded chain of links.

It is thus preferred, that the first direction and the second direction of rotation are arranged at an angle to each other. The collapsing/folding or extension of the chain of links is thereby provided in another plane than the rotation of the chain of links around the bracket. These two motions are decoupled and do not hinder each other. An introduction region for receiving the cable from the structural part of the aircraft at the second end may thereby provide a least possible motion and the excess length of the cable extending from the structural component to the introduction region is as small as possible.

Exemplarily, the angle is 90°. This means, that the rotational axis of the joint in the bracket and between the connected links are orthogonal to each other, which leads to a further improved movability of the links relative to each other.

A still further embodiment of the assembly according to an embodiment of the invention comprises an entering guide, which is located at one of the links connected to the bracket for receiving the cable from the structural part of the aircraft and for leading it into the links that follow on. The entering guide may comprise at least one and preferably two surfaces arranged at a distance to each other and smoothly run into the profile of the respective link at the second end. The surfaces preferably widen up in a direction facing away from the link, which means that their distance increases for collecting and guiding one or more cables into the chain of links. Widening this section is advantageous as this may allow the cable section between the entering guide and the exiting point at the structural component to partially compensate the pivotal motion around the bracket. A larger degree of freedom for the cable that runs from the structural part to the introduction region of the link at the bracket is thereby provided.

In a preferred embodiment, the entering guide extends beyond the bracket and faces away from the link connected thereto. This ensures a required segregation of the cables and the skin of the aircraft structure, which allows for eliminating a contact based damaging, i.e. through friction, of the cable through the aircraft structure.

The invention further relates to a wing of an aircraft, comprising a wing structure and an aerodynamic body movably supported relative to the wing structure, wherein an assembly presented above is connected to the wing structure and to the aerodynamic body. The aerodynamic body may preferably be a slat, which may especially include a leading edge slat that conducts a clear and prominent translational motion relative to the wing structure. The covered distance between the aerodynamic body and the structural part of the aircraft needs to be bridged by the cable, which is guided by the assembly according to the invention in a reliable and safe manner, independent from lateral, air load induced motions between the aerodynamic body and the wing structure.

Finally, the invention relates to an aircraft comprising at least one such wing. In an embodiment, the aircraft comprises a wing de-icing or anti-icing device inside the aerodynamic body, which is connected through a cable with a power source inside the wing structure, wherein the cable runs through the assembly extending between the wing structure and the aerodynamic body.

BRIEF DESCRIPTION OF THE DRAWINGS

Further characteristics, advantages and application options of the present invention are disclosed in the following description of the exemplary embodiments in the figures. All the described and/or illustrated characteristics per se and in any combination form the subject of the invention, even irrespective of their composition in the individual claims or their interrelationships. Furthermore, identical or similar components in the figures have the same reference characters.

DETAILED DESCRIPTION

Figure 1:
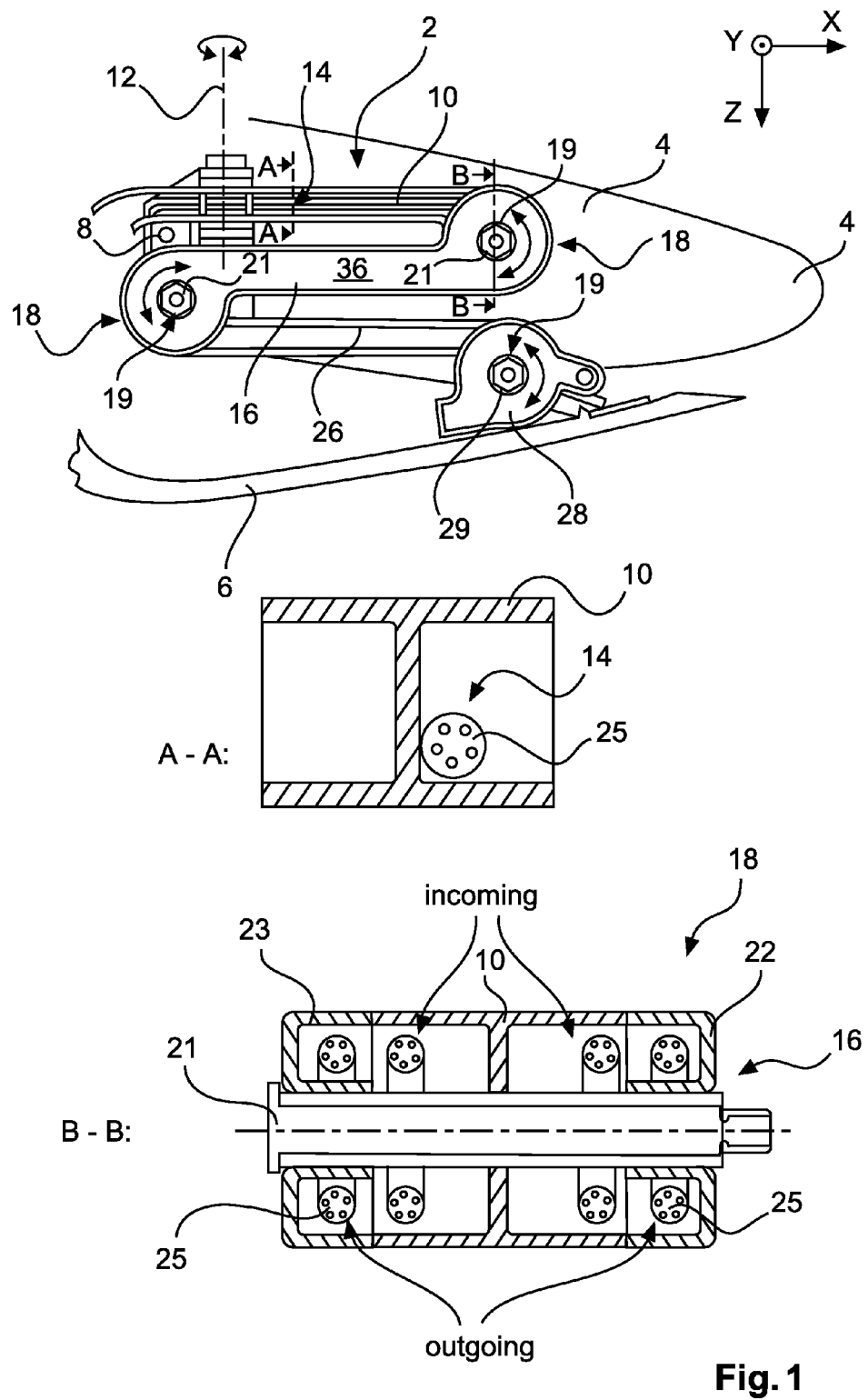
FIG. 1 schematically shows an assembly for guiding a cable between a leading edge slat and a wing structure in a collapsed state.

FIG. 1 shows an assembly 2 according to an embodiment of the present invention arranged between a wing structure 4 of an aircraft and a movably supported aerodynamic body 6, which is designed as a leading edge slat in this exemplary embodiment. The assembly 2 comprises a bracket 8, which is attached to the wing structure 4 and supports a first link 10, which is swivably mounted around a first axis 12 defined by and extending through the bracket 8. In this exemplary embodiment the first axis 12 is arranged substantially parallel to the z axis of the aircraft, which vertically extends to the longitudinal axis x of the aircraft, to which the wing structure 4 belongs, and parallel to the gravitational force (the relating coordinate system is shown in FIG. 1). The first link 10 consequently stays in a plane extending substantially vertically to the first axis 12. At an end opposite to the bracket 8, the first link 10 provides a substantially fixed vertical position for a second link 16, which is pivotally connected to the first link 10. Primarily in case air loads or thermal expansion effects lead to a lateral motion of the slat 6 relative to the wing structure 4, the rotation of the first link 10 around the first axis 12 prevents straining forces at the bracket. Besides that, the positioning of the first axis 12 in the bracket 8 for supporting one end of the first link 10 ensures the required segregation of a cable and a wing skin.

The first link 10 exemplarily comprises a rim- or channel-like structure 14, which is adapted for receiving and guiding a cable 25 from the wing structure 4 to the second link 16. In a sectional view A-A an exemplary double-T-shaped profile structure 14 of the first link 10 is presented. At least in case an open profile is used, appropriate holders, such as clips or brackets, should be used for holding the cable 25 relative to the respective link. However, this cross sectional profile surface has to be understood merely as an example, which is neither binding nor preferred. The person skilled in the art may choose any other open or closed cross sectional surface of this profile meeting the individual requirements or design demands.

The second link 16 is connected to the first link 10 by means of a first coil device 18 comprising a central opening 19, through which a joint axis 21, e.g. comprising a pin or bolt, extends and allows for the pivoting motion between the first link 10 and the second link 16. Exemplarily, the pivoting motion provided by the first coil device 18 is basically conducted around the y-axis. In the interior of the first coil device, the cable to be guided is wound around the joint axis 21 and runs from the first link 10 into the second link 16 in form of a helical coil. The first coil device 18 may comprise two main housing components 22 and 23, that are either connected to the first link 10 or to the second link 16 and are adapted for rotating about the joint axis 21. An exemplary embodiment of the first coil device 18 is shown in a sectional view B-B. Here, at each side of the first coil device 18 a cable 25 may be fed through, wherein it is wound by more than 360° inside the first coil device 18 around the joint axis 21. As rendered more clear by the sectional view B-B the second link 16 comprises two closed profiles for guiding cables 25. The first link 10 is enclosed between the two main housing components 22 and 23.

Following on from the second link 16, a third link 26 is pivotally connected to the second link 16 by means of another first coil device 18 at an end opposite to the connection between the first link 10 and the second link 16. Here, the joint axes 21 of both first coil devices 18 are parallel to each other. By moving the slat 6 into an extension position relative to the wing structure 4, the assembly of the first, the second and the third links 10, 16 and 26 is unfold by pivoting the respective links around the joint axes 21. The third link 26 may be designed in the same manner as the first link 10, such that it may comprise an open profile cross section, too.

Following on from the third link 26, a second coil device 28 is provided at an end of the third link 26 opposite to the connection between the second link 16 and the third link 26. The second coil device 28 also comprises a central opening 19, through which a joint axis 29 extends. The second coil device 28 is attached to the slat 6 for passing a cable from the chain of links 10, 16 and 26 to the slat 6. Preferably, the joint axis 29 of the second coil device 28 is parallel to the joint axes 21 of the first coil devices 18.

Figure 3:
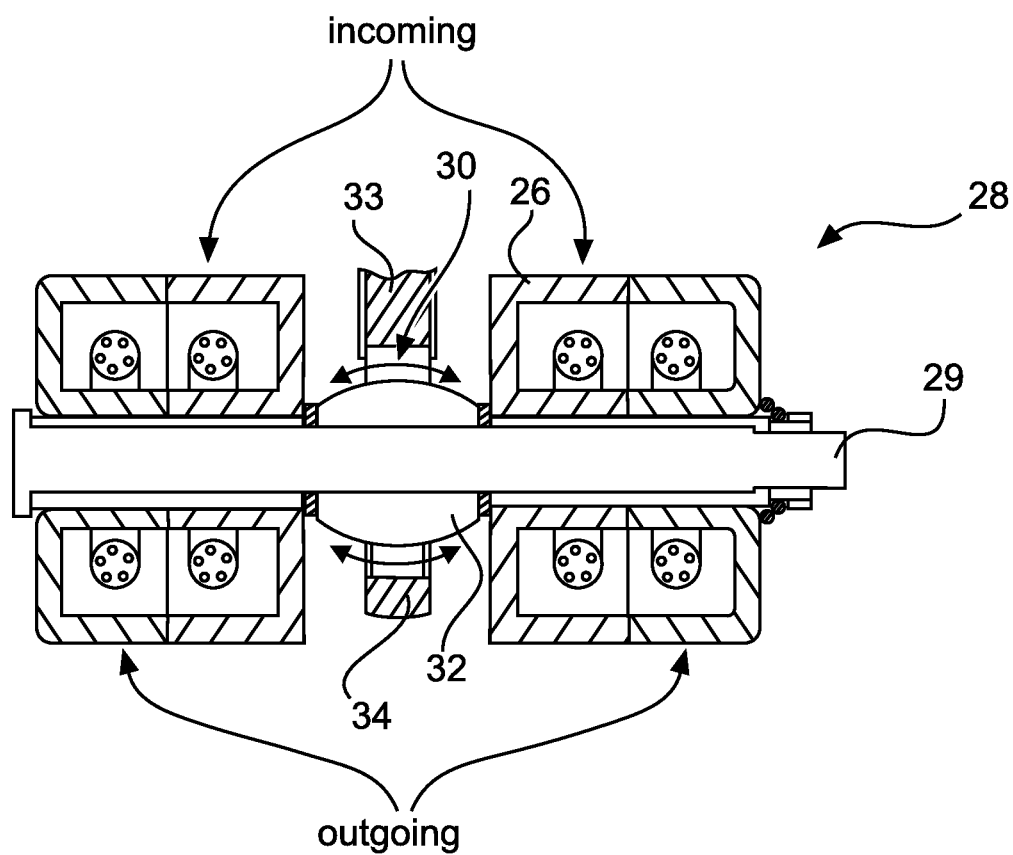
FIG. 3 shows a sectional view of an exemplary bearing that permits an angular rotation around two orthogonal axes at a second coil device.

As rendered more clear in FIG. 3, the second coil device 28 allows for compensation of lateral motions due to air loads during the flight, which lateral motions comprise a translational component parallel to the joint axes 21 and 29, respectively. This is achieved by a bearing in the second coil device 26 that permits an angular rotation in two orthogonal directions.

Figure 2:
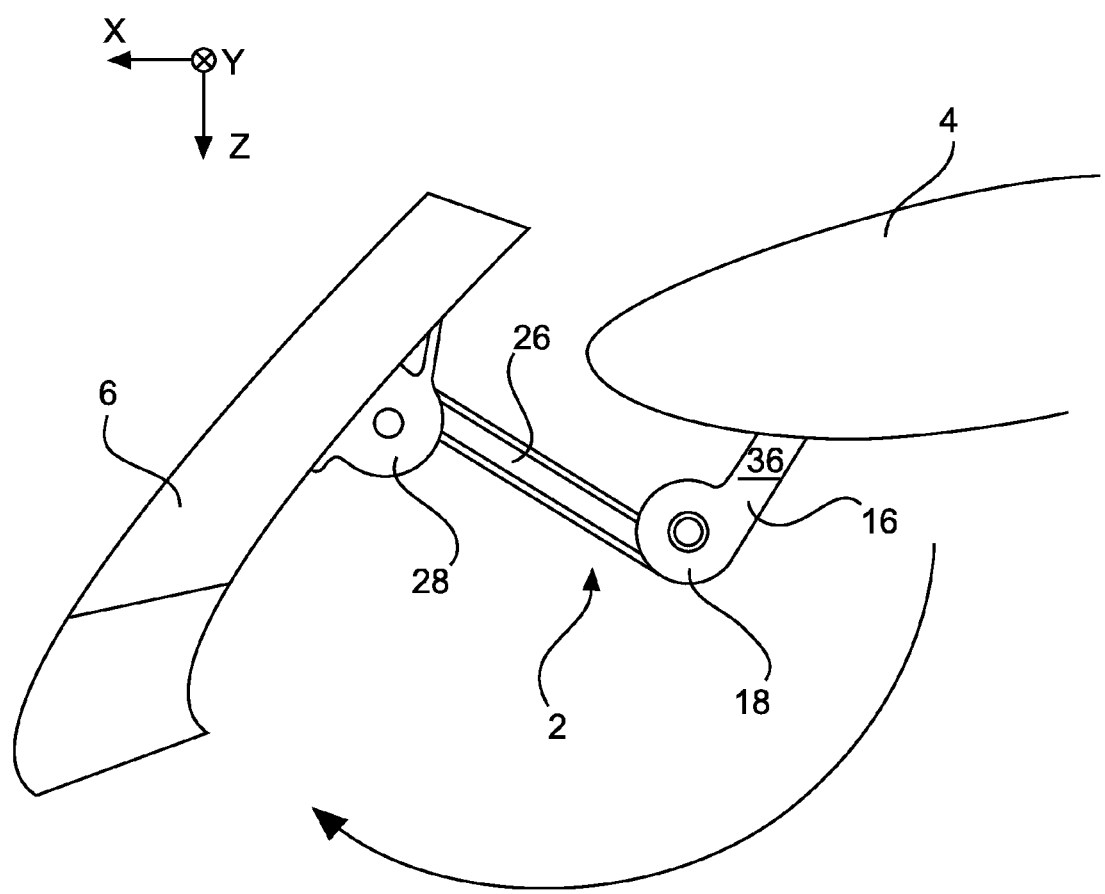
FIG. 2 schematically depicts the extension of the slat shown in FIG. 1 and the assembly for guiding a cable being extended.

As stated before, FIG. 1 shows the slat 6 in a fully retracted position, e.g. during cruise flight conditions. The chain of links 10, 16 and 26 assumes a folded/collapsed shape as compact as possible and rest on each other. FIG. 2 shows an extended position of the slat 6, which has to be followed by the assembly 2 for guiding a cable according to the invention.

FIG. 3 depicts the second coil device 28 in a sectional view. A spherical bearing 30, comprising a ball segment 32 rotatably supported on the joint axis 29, as well as a ring 34 enclosing the ball segment 32, thereby providing two spherically engaging bearing surfaces, is present. Due to the expected air loads during flight, a kinetic decoupling between the assembly 2 and the aerodynamic body 6 is supported through the bearing 30 directly at the slat 6 and the bearing at the bracket 8 connected to the aircraft structure. By using the spherical bearing 30 at an attachment flange 33 to the slat 6, only translational forces can be transmitted. The pivotal support on the bracket 8 around the axis 12 being orthogonal to the joint axis 29 further ensures the statically determinate (iso-static) support of the assembly 2. The location and the direction of the axis 12 of the bracket 8 is determined such that a center of the spherical bearing 26 keeps a certain distance during deployment of the aerodynamic body 6. It goes without saying that the second coil device 28 may also comprise two main housing components 22 and 23 in a symmetrical arrangement and that the third link 26 is enclosed by these two main housing components.

Figure 4:
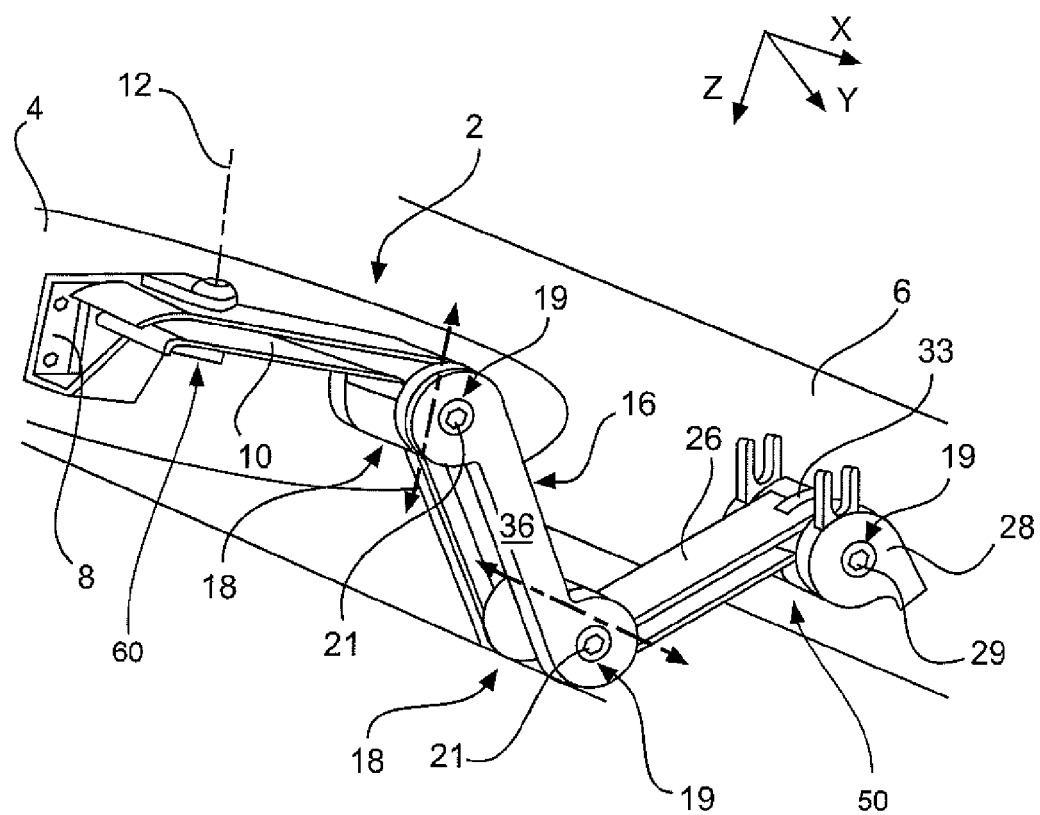
FIG. 4 demonstrates the additional motion due to air loads on the assembly for guiding a cable in an extended state.

In FIG. 4, a further drawing of an extended assembly 2 is shown, where the aerodynamic body 6 is extended from the wing 4 such that the assembly 2 is extended, too. As made visible through the dashed arrows, lateral forces are shown, which may be compensated by the combination of the bearing included into the bracket 8 and spherical bearing 30.

Further, a cover plate 36 covers both first coil devices 18. This simplifies the assembly, repair and maintenance of the assembly 2 significantly. By simply removing the cover plate 36, a cable may be introduced into the channel-like structure 14 in the second link 16.

Additionally, a possible structure of the individual links 10, 16 and 26 is demonstrated. While the first link 10 comprises an open profile cross section 14 with lateral recesses for the cable 25, the second link 16 comprises two laterally positioned and closed cross-sectional shapes. Here, the cable 25 coming from the first link 10 runs from the lateral recesses into the subsequent closed profile shape. As stated before, the third link 26 may be designed similar to the first link 10, such that the cable 25 may run from the closed cross-sectional shapes of the second link 16 into the lateral recesses of the third link 26. This allows a simplified design of the assembly 2 and especially of the first coil devices 18 and the second coil device 28. As the cable 25 comprises the shape of a helical coil it is mandatory for the cable 25 to change a lateral position along the run length of the chain of links, which can be accomplished by subsequently running through lateral recesses and a closed shape of the links 10, 16 and 26. The second coil device 28 is arranged at a first end 50 of the chain and the bracket 8 is pivotally connected to the link 10 at a second end 60 of the chain.

Figure 5:
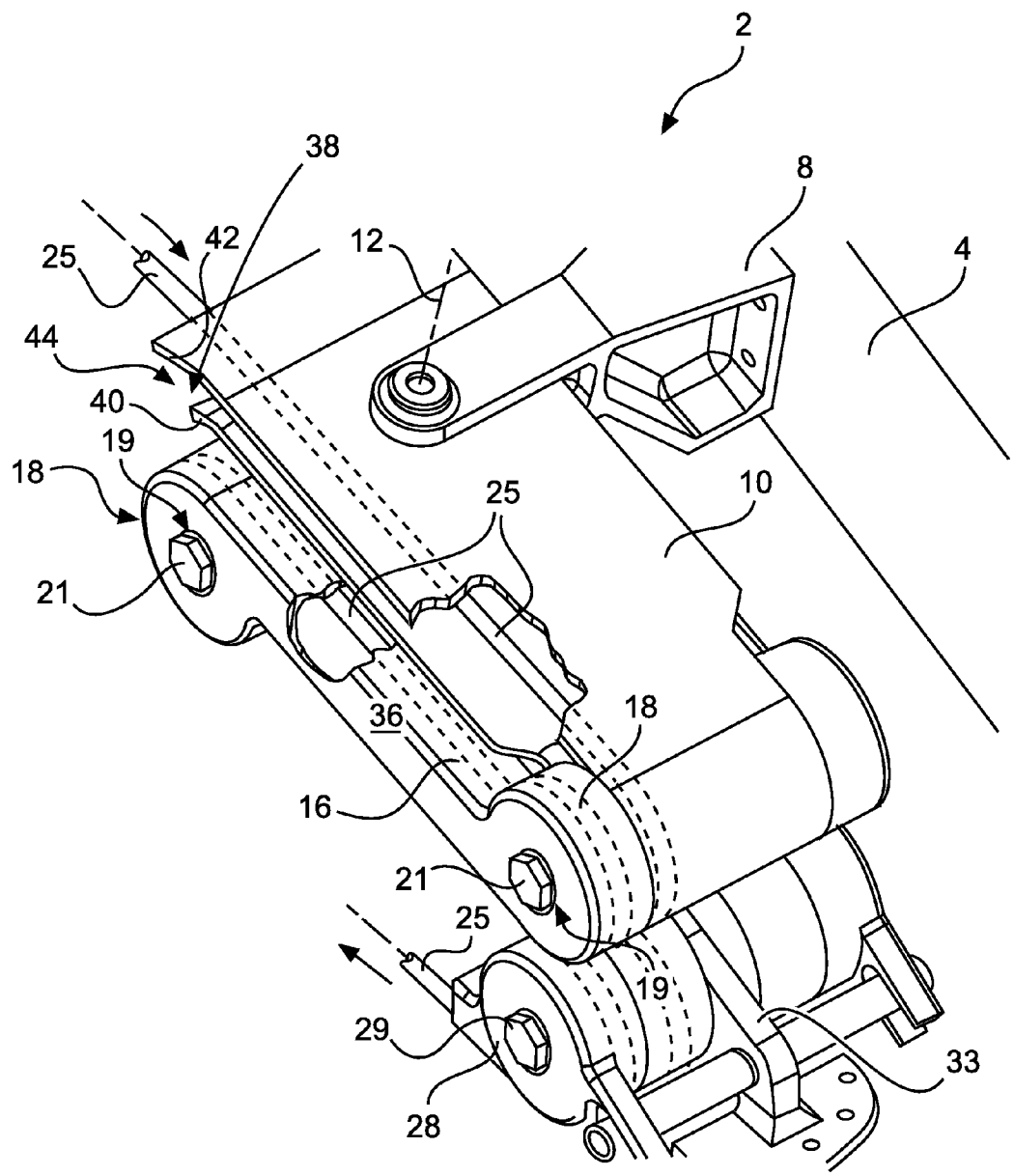
FIG. 5 shows a still further drawing of an assembly for guiding a cable in a collapsed/folded state.

FIG. 5 depicts the assembly 2 in a folded state with the links 10, 16 and 26 basically laying flush on each other. In the drawing, the first link 10 is on top, which first link 10 comprises an entering guide 38, which basically consists of two surface sections 40 and 42 arranged at a distance to each other and defining an entering region 44 for a cable 25. The entering guide 38 is located at an end of the first link 10 opposite to the connection with the second link 16 and extends beyond the bracket 8 in a direction facing away from the connection to the second link 16. The distance between the two surface sections 40 and 42 may increase in this direction for improving the collecting and guiding function of the entering region. Altogether, the entering guide 38 together with the bracket 8 allow for a required segregation of the cable from a skin of the aircraft structure and for a perfect introduction into the chain of links 10, 16 and 26.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. An assembly for guiding a cable between a structural part of an aircraft and an aerodynamic body movably supported relative to the structural part, the assembly comprising:
   a chain for receiving the cable, the chain having at least first and second pivotally connected links, the first and second links pivoting about a joint axis, the chain having a first end and a second end;
   a first coil device arranged between the at least first and second pivotally connected links for guiding the cable between first and second angular positions;
   a second coil device arranged at the first end of the chain for passing the cable from the chain to the aerodynamic body;
   a bracket pivotally connected to one of the links situated at the second end of the chain for mounting the chain at the structural part, which bracket permits an angular rotation around a first axis, substantially parallel to a vertical z-axis of the aircraft, but no translative motion of the aerodynamic body relative to the structural part; and
   a spherical bearing located at one of the links which is connected to the second coil device at the first end of the chain, which bearing permits angular rotation at least in two orthogonal directions, but no translative motion relative to the aerodynamic body,
   wherein the first axis of the bracket and the joint axis of the first and second connected links are orthogonal to each other.

2. The assembly of claim 1, wherein the first coil device comprises a joint having a joint axis, around which the cable is wound with at least one complete winding.

3. The assembly of claim 1, further comprising a second first coil device connected to the second link,
   wherein the first and second first coil devices are covered by a single cover plate extending between the first and second first coil devices and covering a recess of the second link.

4. The assembly of claim 3, wherein the cover plate is removable from the link without disassembling the chain of links.

5. The assembly of claim 1, wherein the bracket comprises a joint which permits angular rotation only in a first direction of rotation.

6. The assembly of claim 5, wherein the pivotally connected links are adapted for conducting an angular rotation only in a second direction of rotation.

7. The assembly of claim 5, wherein first direction and the second direction of rotation are at an angle to each other.

8. The assembly of claim 7, wherein the angle is 90°.

9. The assembly of claim 1, further comprising an entering guide located at one of the links connected to the bracket for receiving the cable from the structural part of the aircraft and leading it into the links.

10. The assembly of claim 9, wherein the entering guide extends beyond the bracket and faces away from the link connected thereto.

11. A wing of an aircraft, comprising a wing structure and an aerodynamic body movably supported relative to the wing structure, wherein an assembly for guiding a cable between the wing structure of the aircraft and the aerodynamic body is connected to the wing structure and to the aerodynamic body, the assembly comprising:
   a chain receiving the cable, the chain having at least first and second pivotally connected links, the first and second links pivoting about a joint axis, the chain having a first end and a second end;

a first coil device arranged between the at least first and second pivotally connected links for guiding the cable between first and second angular positions;

a second coil device arranged at the first end of the chain for passing the cable from the chain to the aerodynamic body;

a bracket pivotally connected to one of the links situated at the second end of the chain for mounting the chain at the structural part, which bracket permits an angular rotation around a first axis, substantially parallel to a vertical z-axis of the aircraft, but no translative motion of the aerodynamic body relative to the structural part; and a spherical bearing located at one of the links which is connected to the second coil device at the first end of the chain, which bearing permits angular rotation at least in two orthogonal directions, but no translative motion relative to the aerodynamic body, wherein the first axis of the bracket and the joint axis of the first and second connected links are orthogonal to each other.

12. The wing of claim 11, wherein the aerodynamic body is a slat.

13. An aircraft, comprising at least one wing comprising a wing structure and an aerodynamic body movably supported relative to the wing structure, wherein an assembly for guiding a cable between the wing structure of the aircraft and the aerodynamic body is connected to the wing structure and to the aerodynamic body, the assembly comprising:

a chain for receiving the cable, the chain having at least first and second pivotally connected links, the chain having a first end and a second end;

a first coil device arranged between the at least first and second pivotally connected links for guiding the cable between first and second angular positions, the first and second links pivoting about a joint axis;

a second coil device arranged at the first end of the chain for passing the cable from the chain to the aerodynamic body;

a bracket pivotally connected to one of the links situated at the second end of the chain for mounting the chain at the structural part, which bracket permits an angular rotation around a first axis, substantially parallel to a vertical z-axis of the aircraft, but no translative motion of the aerodynamic body relative to the structural part; and a spherical bearing located at one of the links which is connected to the second coil device at the first end of the chain, which bearing permits angular rotation at least in two orthogonal directions, but no translative motion relative to the aerodynamic body, wherein the first axis of the bracket and the joint axis of the first and second connected links are orthogonal to each other.

14. The aircraft of claim 13, comprising a wing de-icing device inside the aerodynamic body, which is connected through a cable with a power source inside the wing structure, wherein the cable runs through the assembly extending between the wing structure and the aerodynamic body.

* * * * *